Jan. 8, 1929.

P. C. COLE 1,698,152

ELEVATING GRADER

Filed June 6, 1927

P. C. Cole Inventor

By Emil F. Lange

Attorney

Jan. 8, 1929.　　　　　　　　　　　　　　　　　　　1,698,152
P. C. COLE
ELEVATING GRADER
Filed June 6, 1927　　　　2 Sheets-Sheet 2

P. C. Cole Inventor

Emil F. Lange

Attorney

Patented Jan. 8, 1929.

1,698,152

UNITED STATES PATENT OFFICE.

PERRY C. COLE, OF AUBURN, NEBRASKA.

ELEVATING GRADER.

Application filed June 6, 1927. Serial No. 196,896.

My invention relates to elevating graders and its primary object is the provision of a drum which receives soil and lifts the soil on its inner peripheral wall and delivers it at either side.

Another object of my invention is the provision of an endless flexible conveyer inside the drum and so positioned with reference to the inner peripheral wall of the drum that it assists in the lifting of the soil.

Another of my objects is the provision of a lateral conveyer for receiving the soil from the drum and for transporting it to the side of the drum, the conveyer being adjustable to deliver the soil at either side of the drum.

Another object of my invention is the provision of a draft device which is adjustable to reduce the side draft of the implement regardless of which side the delivery conveyer is positioned.

It is also my object to provide an elevating grader which may be made at a relatively low cost and which will elevate the soil and deliver it at the side of the grader with the least possible expenditure of energy and at the lowest possible cost and in which the distance through which the soil is transported from the road to the wagon is reduced to a minimum.

Having in view these objects and others which will be pointed out in the following description, I will now refer to the drawings, in which Figure 1 is a view in isometric projection of the elevating drum and cooperating members.

Figure 1:
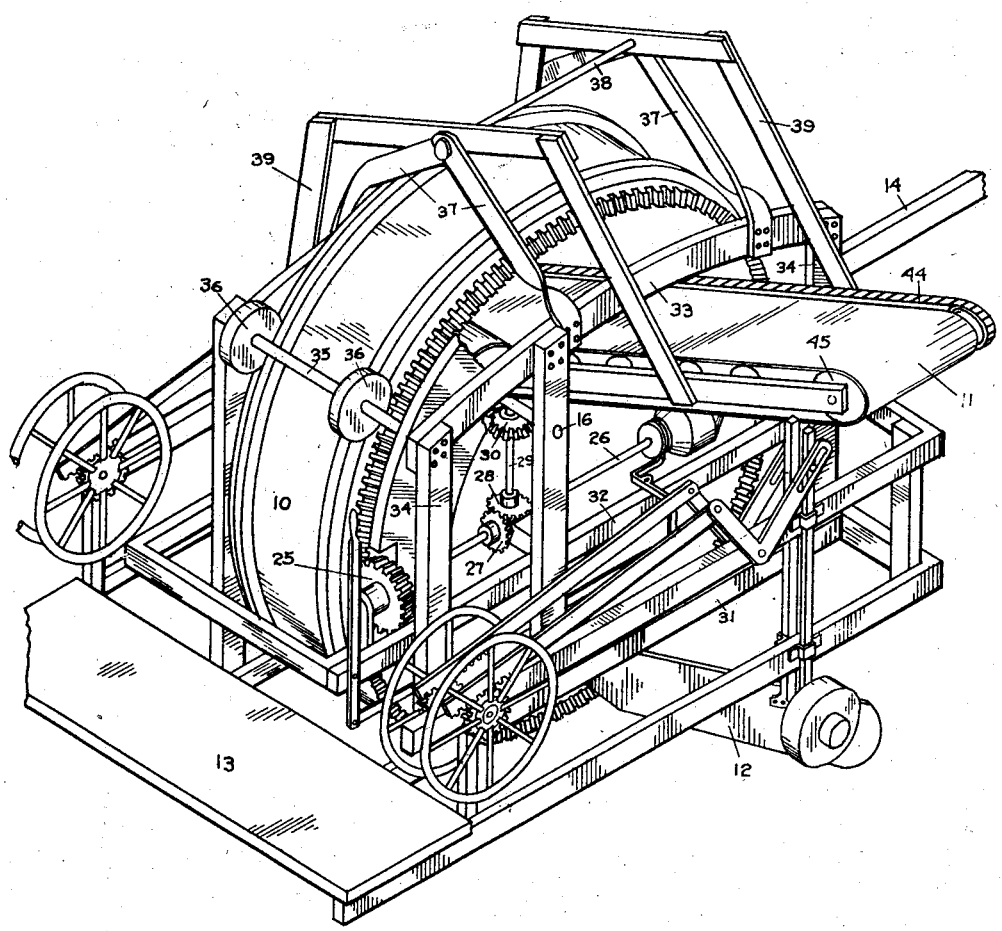

The machine consists largely of a drum 10 for elevating excavated soil to a conveyer 11 and having means, such as the scrapers 12, for feeding the soil into the drum. It also includes a rear platform 13 for the driver and a front draft appliance 14, the front draft appliance being designed for adjustment to take care of the side draft due to the shifting of the load on the conveyer 11 when the conveyer is shifted from one position to the other.

Figures 2, 4:
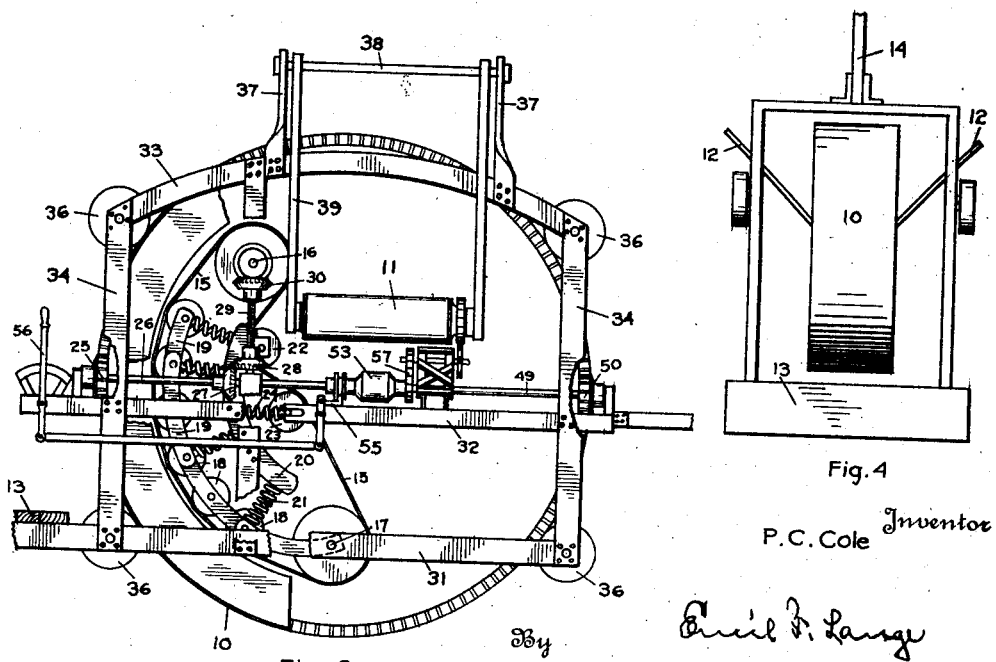
Figure 2 is a side elevational view of the elevating drum.
Figure 4 is a diagrammatic plan view of the entire machine.

The drum, as shown in Figures 1 and 2, is hollow and is provided with an endless flexible conveyer 15 which cooperates with the inner peripheral wall of the drum. The conveyer 15 is supported on two rollers which are mounted on fixed shafts 16 and 17, the shaft 16 being the driving shaft for the conveyer 15. Due to the heavy load which is placed on this carrier, it is supported at a number of points by means of rollers 18 which are flexibly mounted, the construction of the mounting being best shown in Figure 2. The mounting consists of a plurality of curved links 19 which are pivotally connected in end to end relation and with the lower end links pivotally secured to the shaft 17. The rollers 18 are journalled in links 19. Secured to the frame of the drum and more or less concentric therewith is an arcuate member 20 which serves as an abutment for the springs 21 which bear against the segmental members 19 and urge them normally toward the periphery of the drum. It will be obvious that soil which is fed into the drum will be carried up a certain distance by the inner peripheral wall of the drum during its travel and that it will then be engaged between the outer run of the conveyer 15 and the inner peripheral wall of the drum. It will also be apparent that the size of the throat between the lower roller and the inner peripheral wall governs the rate at which soil may be fed into the conveying channel and that the flexibility of the arcuate members 19 under the action of the springs 21 will prevent clogging or choking of the conveyer.

The conveyer 15 is deflected over an idler 22 and over a belt tightening idler 23. The idler 22 is mounted on the fixed shaft but the shaft of the idler 23 is slidable in a more or less horizontal direction toward and away from the conveyer 15. The spring 24 urges the shaft of the idler 23 toward the belt and thus maintains the requisite tension in the conveyer.

The means for driving the conveyer 15 is best shown in Figure 2. The edge of the drum 10 is provided with gear teeth for driving the pinion 25 on the shaft 26. The shaft 26 has secured thereto a bevel pinion 27 which meshes with a bevel pinion 28 on the shaft 29 and having a bevel pinion 30 at its upper extremity. The pinion 30 meshes with and drives a pinion on the shaft 16. The various gears and pinions may, of course, be varied so as to drive the conveyer 15 at a rate equal to that of the movement of the drum 10 or it may be geared so as to drive the conveyer either faster or slower than the drum. It will usually be found, however, that the rates of movement of the conveyer and of the drum should be approximately equal.

The drum is supported inside a vehicle frame as shown in Figure 1. This frame comprises horizontal members 31, 32 and 33 and vertical members 34, the members 31, 33 and 34 being arranged in more or less rectangular relation. The two opposite frame members are connected together at their corners by means of shafts or rods 35 and these shafts or rods carry rollers 36 which bear against the outer peripheral wall of the drum 10. Inside the drum 10 and immediately underneath the outlet end of the conveyer 15 is a lateral conveyer 11. The conveyer 11 is rigidly secured to a frame which is suspended from a fixed frame projected upwardly from the frame members 33. In my preferred construction I employ four frame members 37 to form two inverted V-shaped uprights and I connect these two uprights by means of a rod 38 which serves as a pin or axis for supporting the frame of the lateral conveyer 11. This frame consists of two pairs of upwardly converging beams 39, each pair being connected by means of a cross beam 40 which is pivoted directly to the support 38. The frame may be swung from one side to the other either mechanically or manually so that the soil may be delivered into wagons at either side of the machine and it may be held in position by any desired means.

Figure 3:
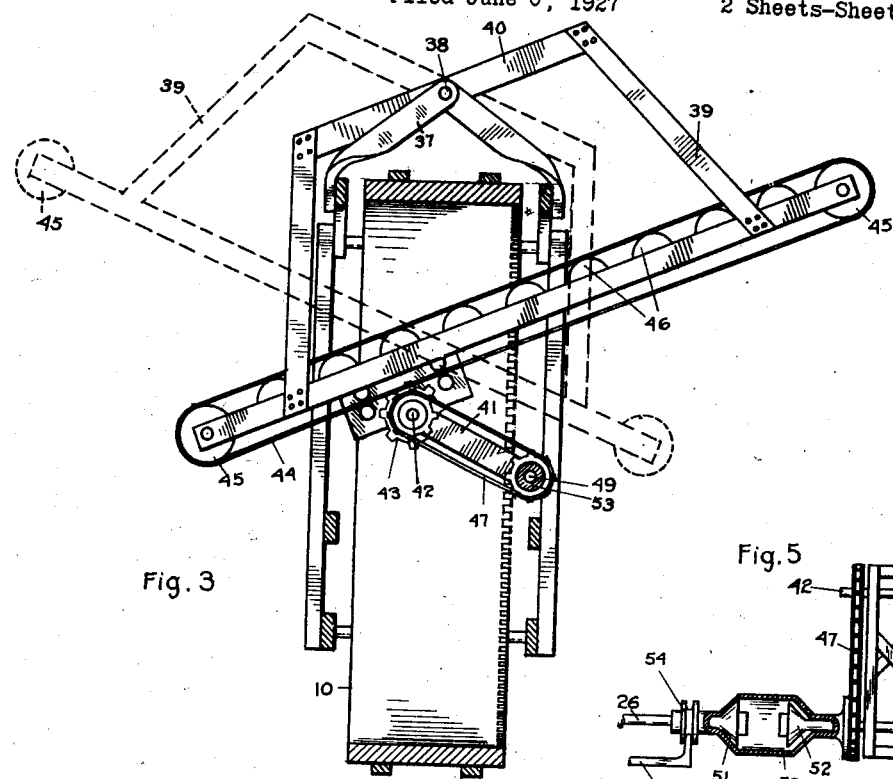
Figure 3 is an elevational view of the carrier and its support.
Figure 5:
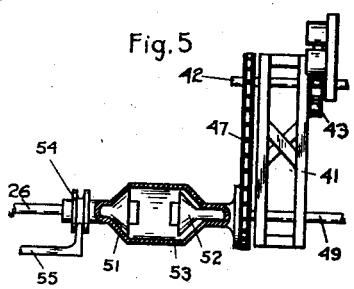
Figure 5 is a view in elevation of the clutch mechanism for driving the conveyer in either direction.

The lateral conveyer 11 is positively driven by means of the gearing shown in Figures 2 and 3. Slidably secured to the conveyer chain is a supporting member 41 having a transverse shaft 42 which carries a sprocket wheel 43 and engaging a sprocket chain 44 of the conveyer. The sprocket chain 44 travels over two sprocket wheels 45 at opposite ends of the conveyer frame. Due to the heavy load carried by the conveyer, the upper run thereof is supported on a plurality of rollers 46 which serve as idlers and which are secured to shafts journalled in the conveyer frame. The shaft 42 is driven by means of a sprocket chain 47 which in turn is driven by a sprocket wheel on the shaft 49. Referring now to Figure 2, there is provided a shaft 49 which is in alignment with the shaft 26. The shaft 49 has secured thereto a gear 50 which meshes with the toothed edge of the drum 10. It will be obvious that the shafts 26 and 49 will be driven in opposite directions and that if the conveyer is driven by one or the other of these two shafts, it will operate in the direction determined by that shaft. The shafts are therefore provided at their inner ends with cone members 51 and 52 and they are enclosed by means of a sleeve 53 having cone shaped ends. By shifting the sleeve 53 in one direction or the other, it may be forced into engagement with either the cone 51 or the cone 52 and the sleeve 53 will then rotate in the direction of the cone with which it is in engagement. For thus shifting the sleeve 53, any suitable shifting mechanism may be employed as for instance a grooved member 54 and a link 55 which may be actuated by means of a lever 56. The sleeve 53 is further provided with a sprocket wheel for driving the sprocket chain 47.

The elevating grader which I have described and shown in my drawings possesses numerous marked advantages over graders now in use. The drum and its tread are very narrow so that the machine can be operated in places which are inaccessible to graders of the ordinary types. It may be operated at the extreme side of the road where the ditch causes considerable trouble for graders of other forms. It may be operated on either side of the road because the transverse conveyer may be shifted to deliver the soil on either side of the machine or it may be shifted to deliver the soil at the side of the road when the conditions are such as to make this desirable. The soil may be delivered to the drum in any desired manner and the natural movement of the drum will tend to lift the soil on the inner peripheral back wall of the drum, this lifting tendency being accentuated by means of the endless belt conveyer 15. The loose soil travels a distance of the minimum length through a circular arc and is then delivered to the transverse conveyer. The energy required to lift the soil is thus reduced to a minimum. The belt 15 is so arranged that its is always tight and that it is yieldable under excessive loads so that there is no danger of the clogging of the passageway and the consequent injury to the belt.

Having thus described my invention in such full, clear, and exact terms that its construction and operation will be readily understood by others skilled in the art to which it pertains, what I claim as new and desire to secure by Letters Patent of the United States is:

1. In an elevating grader, a rotatable drum adapted to travel over the surface of the soil and to receive soil therein, a conveyer within said drum for lifting the soil against the inner peripheral back wall of the drum during the travel thereof, said conveyer being yieldable to prevent choking of the passageway for the soil, and means for receiving the soil from the interior of said drum and delivering it at the side of the grader.

2. In an elevating grader, a rotatable drum adapted to travel over the surface of the soil and to receive soil therein, a flexible conveyer forming with the inner peripheral back wall of the drum a channel for the upward passage of the soil, a transverse conveyer for receiving the soil from said drum and delivering it at the side of the grader, and means on said drum for driving both of said conveyers.

3. In an elevating grader, a rotatable drum adapted to travel over the surface of the soil and to receive loose soil therein, an endless conveyer within said drum and forming a channel for the upward passage of the soil between said conveyer and the inner peripheral rear wall of the drum, a plurality of rollers within said conveyer, and springs for normally urging said rollers against said conveyer and toward the back wall of said drum.

4. In an elevating grader, a rotatable drum adapted to travel on the surface of the soil and to receive loose soil therein, an endless conveyer within said drum and adapted to lift the soil along the inner back wall of said drum, said conveyer being fixed relatively to said drum, a fixed abutment within said conveyer, an arcuate member bearing against said conveyer, and resilient members between said abutment and said arcuate member for normally urging said conveyer toward the rear wall of said drum.

In testimony whereof I affix my signature.

PERRY C. COLE.